3,558,519
ALUMINUM NICKEL CATALYST COMPOSITION

Nhu Hung Phung, Antony, and Gilles Lefebvre, La-Celle-St.-Cloud, France, assignors to Institut Francais du Petrole des Carburants et Lubrifiants, Rueil-Malmaison, France
No Drawing. Filed Jan. 10, 1968, Ser. No. 696,716
Claims priority, application France, Jan. 11, 1967, 90,771
Int. Cl. C07c 3/10; C08d 1/14, 3/04
U.S. Cl. 252—429                    2 Claims

ABSTRACT OF THE DISCLOSURE

A catalytic composition comprising an admixture of at least one compound selected from the group consisting of $AlR_2X$, $AlRX_2$, $Al_2R_3X_3$, $AlR_3$, $AlR(OR')X$, $AlR_2(OR')$ and $AlR(OR')_2$ with an organometallic complex resulting from contacting a complex having the formula $RPX_4$ $AlX_3$ with a nickel compound, X being a halogen atom and R and R' being monovalent hydrocarbon radicals.

---

This invention relates to new complexes obtained by reacting organometallic complexes with inorganic or organic compounds of the transitional metals of Groups IV to VIII of the periodic chart of the elements.

More particularly this invention relates to new complexes obtained from soluble compounds of nickel, iron, chromium, vanadium, palladium, rhodium and titanium.

According to a particular embodiment, the invention relates to new catalysts for the dimerisation, polymerisation and copolymerisation of mono- and polyolefinic hydrocarbons, said catalysts being obtained by contacting trihydrocarbylaluminum or halohydrocarbylaluminum compounds with the new nickel containing complexes.

The starting complexes conform to the formula $RPX_4$, $AlX_3$, (I) wherein P is phosphones, Al aluminum, X a halogen and R a monovalent hydrocarbon radical. Since these complexes are part of the prior art, no detailed description of their manufacture is necessary, it being sufficient to mention that they may be manufactured by reacting a phosphorus trihalogenide with a RX halogenide and an aluminum halogenide.

It must be understood that as starting compounds, for the manufacture of the new complexes of this invention, all those which conform to the Formula I may be used, particularly those which contain hydrocarbon radicals selected, for example, among alkyl, cycloalkyl, aryl, arylalkyl and alkaryl radicals containing for example 1 to 30 carbon atoms.

The alkyl halogenides preferably contain up to 8 carbon atoms. The following will be named by way of examples: ethyl bromide, propyl chloride, butyl iodide, pentyl fluoride.

The synthesis of the new complexes of this invention consists of reacting the complexes of Formula I with a compound of a transition metal of Groups IV to VIII, more particularly a soluble compound of nickel, iron, chromium, vanadium, palladium, rhodium or titanium, or a mixture of several of these compounds.

This reaction is preferably carried out in the presence of a solvent for the complex (I) and for the compound of transition metal, for example an aromatic hydrocarbon or a haloaromatic hydrocarbon, for instance the following benzyl chloride, 1,4-dichlorobenzene, cyclopentyl chloride, phenyl chloride, cyclohexyl chloride, 1 - chloro-3-phenyl propane, 1-bromo-3-phenyl hexane.

Preferably a soluble compound of the above-mentioned transitional metals will be reacted with a complex (I), more particularly those in which the said metals are associated as complexes with β-difunctional organic substances, for example containing 2 to 20 carbon atoms per molecule, said functions being advantageously selected from the following:

$$-\overset{|}{\underset{|}{C}}-OH, -CO-, -COOR, -COOH, -CHO.$$

By way of examples, the following will be named: the complexes of nickel, iron, chromium, vanadium, palladium, rhodium or titanium with a β-diketone such as trifluoroacetylacetone, benzoylacetone, 3-methyl-2,4-pentanedione, acetylacetone; with a β-ketoester such as ethyl acetoacetate; with a α-β-ketoaldehyde such as formylacetone; with a β-hydroxyketone such as hydroxyethylmethylketone, and the like.

The reaction between the complex (I) and the compound of transition metal is usually carried out at ambient temperature whereas it is possible to operate at different temperatures.

The reaction between the complex (I) and the compound of a transition metal is usually accompanied by a change of coloration and the formation of a new complex (II) which may be isolated by any conventional method such as filtration, decantation, evaporation of the solvent and the like.

The amounts of reactants which are required in the manufacture of the complex (II) may vary broadly. Thus the atomic ratio P/M (where P is phosphorus in the complex (I) and M is the transition metal) in the reaction medium may vary for example between 0.1 and 10, these values being non-limitative.

It has been observed that amongst the complexes of the (II) type, those obtained from a nickel compound could be advantageously used as components of dimerisation and polymerisation catalysts of mono- and poly- unsaturated hydrocarbons when they were associated with a halohydrocarbylaluminum of the formula $AlRX_2$, $AlR_2X$ or $Al_2R_3X_3$, with a compound $AlR(OR')X$, $AlR_2(OR')$ or $AlR(OR')_2$ or with a trihydrocarbylaluminum $AlR_3$.

It has been observed, on the other part, that the said complexes obtained from a nickel compound and an organoaluminum compound unobviously exhibited the advantage of a good stability even in the absence of olefin, contrary to known complexes, used as catalysts.

In the above formulae, X is a halogen atom such as bromine, iodine, fluorine and preferably chlorine, and R and R' are monovalent hydrocarbon radicals, preferably containing 1–15 carbon atoms and being selected, for example, amongst the alkyl, alkenyl, cycloalkyl, cycloalkenyl, aryl, arylalkyl, alkenylaryl radicals, or amongst the corresponding radicals where aryl is replaced by a monovalent heterocyclic radical.

In order to carry out the dimerisation, polymerisation or copolymerisation of this invention, conventional operating conditions will be used, for example a temperature between $-40$ and $+80°$ C. and preferably between $+20$ and $+40°$ C., a pressure between 0.5 and 50 atmospheres, preferably between 8 and 15 atm., said pressure being however sufficient to maintain a liquid phase.

The amounts of catalyst (complex II and trihydrocarbylaluminum or halohydrocarbylaluminum) necessary to the dimerisation, polymerisation or copolymerisation conform to the conventional amounts usually employed in this type of reaction: for example 0.01 to 10% by weight of catalyst with respect to the monomer to be dimerised, polymerised or copolymerised. Also the ratio trihydrocarbylaluminum or halohydrocarbylaluminum over Ni in the complex (II) may vary from 0.02 to 50 in moles per mole, these values being however not limitative.

The sequence of introduction of the reactants may vary. For example the catalytic species may be preformed, i.e. the complex II may be admixed with the aluminum compound and the whole is introduced into the monomer, or otherwise the catalytic species may be manufactured in the presence of the monomer.

As oligomerisable and particularly dimerisable monomers, monoolefins containing 2–10 carbon atoms, more particularly 3–5 carbon atoms, will be used, such as propylene, 1-butene, 2-butene or other monoolefins with a terminal or internal double bond, pure or as mixture. The best results are obtained with propylene.

With some catalysts such as those based on titanium, it is also possible to obtain polymers of high molecular weight.

The polymerisable monomers will be preferably polyenes, more particularly conjugated dienes of 4–10, specially 4–7, carbon atoms per molecule, such as, for example: 1,3-butadiene, isoprene, 1,3-pentadiene, cyclopentadiene, 1,3-hexadiene, 4-methyl-1,3-pentadiene, 1,3-cyclohexadiene and 1,3-heptadiene.

yellow complex II with the trihydrocarbylaluminum in the absence of monomer. An oily red product is formed which is stable and may be contacted at any moment with the olefin to be dimerised.

The dimerisations are operated at 40° C. In Table I, for example, there is mentioned the nature and the quantity of hydrocarbylaluminum which is associated to complex II, as well as the reaction time, the total conversion rate of propylene and the percentage of the obtained dimers and oligomers.

In Table II, for each example, the results of the chromatographic analysis have been given. The figures give the percentage by weight of each dimer with respect to all dimers.

A comparison of the results given in these two tables shows that it is possible to select the result by choosing appropriate components for the catalytic system.

TABLE I

| Example: | Alkyl-aluminum | Amount ccm. | Reaction time, hours | Percent conversion | Percent dimers | Percent oligomers |
|---|---|---|---|---|---|---|
| 1 | Al(C₂H₅)₃ | 0.25 | 3 | 92 | 95.5 | 4.5 |
| 2 | Al(isoC₄H₉)₃ | 0.45 | 3, 15 mn. | 13 | 86.5 | 13.5 |
| 3 | Al(n-C₆H₁₃)₃ | 0.6 | 3 | 52 | 95 | 5 |
| 4 | Al(C₂H₅)₂Cl | 0.25 | 4 | 85 | 95 | 5 |
| 5 | Al(C₂H₅)₃ | 0.1 | 4 | 87 | 96.2 | 3.8 |
| 6 | Al(C₂H₅Cl)₂ | 0.25 | 4 | 87 | 90 | 10 |
| 7¹ | Al(C₂H₅)₃ | 0.25 | 4, 15 mn. | 91 | 95 | 5 |

¹ The catalytic system has been formed in the absence of monomer.

TABLE II

| | Examples | | | | | | |
|---|---|---|---|---|---|---|---|
| | 1 | 2 | 3 | 4 | 5 | 5 | 7 |
| 4-methyl-1-pentene | 1 | 5.4 | 2.7 | 3 | 1 | 5 | 2.5 |
| 4-methyl-2-pentene cis plus trans | 28.5 | 32.4 | 33.5 | 36 | 30 | 42 | 36.2 |
| 2,3-dimethyl-1-butene | 23.7 | 33.2 | 32.5 | 30 | 26.7 | 18.5 | 10.6 |
| 2-methyl-2-pentene plus 2-hexene trans | 28.2 | 11 | 12.7 | 14 | 23.8 | 21.5 | 34.5 |
| 3-hexene, cis plus trans | 2.4 | 1.3 | 1.3 | 2 | 1.6 | 2 | 3.9 |
| 2-methyl-1-pentene | 7.5 | 12.3 | 13.5 | 10 | 8.8 | 5.5 | 4.8 |
| 2-hexene cis | 3.3 | 4 | 2.8 | 3 | 3.6 | 4.5 | 4.7 |
| 2,3-dimethyl-2-butene | 5.4 | 0.4 | 1 | 2 | 4.5 | 1 | 2.8 |

From the dienes, such polymers as polybutadiene, polyisoprene, polycyclohexadiene and polyheptadiene may be manufactured.

Copolymerisable monomers are for example butadiene, isoprene, isobutene, ethylene and propylene.

The resulting products may be isolated in known manner, for example by decantation, filtration, distillation.

The following, non-limitative examples, illustrate this invention.

EXAMPLE I

The following complex is manufactured:

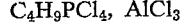

C₄H₉PCl₄, AlCl₃ from aluminum chloride, phosphorus trichloride and n. butyl chloride. The resulting complex is white and crystalline. It is thereafter used to manufacture a complex of the type (II) as follows:

Into a benzenic solution of 0.384 g. nickel acetylacetonate Ni(C₅H₇O₂)₂, there is poured a benzenic solution containing 4 g. of the complex manufactured as above. The temperature is ambient.

A yellow coloration appears. After 2 hours of standing, the mixture has separated into 2 layers: a higher uncolored benzenic layer and a lower oily yellow layer.

The benzenic layer is separated and the yellow layer is washed several times with pure benzene. This yellow layer is then dried under vacuum at ambient temperature. There is finally obtained a crystalline solid product of yellow colour, which constitutes the complex of type II which is then stored protected from oxygen and wetness.

In Examples 1 to 6, there is contacted in the presence of 100 ccm. of liquid propylene, 1.3 g. of yellow complex obtained as above with several trihydrocarbylaluminums.

In Example 7, there is directly contacted 1.3 g. of the

EXAMPLE 8

There is contacted 0.5 g. of the yellow complex (II) prepared as in Examples 1–6, in 50 ccm. of benzene, with 50 g. of butadiene condensed at −20° C.; 0.1 ccm. monochlorodiethylaluminum is added thereafter. After 1 hour at +20° C., the conversion has attained 100% to polymer. This polymer contains 85% 1,4-cis polybutadiene, 10% 1,4-trans polybutadiene and 5% 1,2-polybutadiene.

EXAMPLE 9

0.1 ccm. monochlorodiethylaluminum are added to 0.5 g. of the yellow complex in 50 ccm. of chlorobenzene. 50 g. of liquid butadiene are added at −20° C. After 1 hour at 0° C., 50 g. of polybutadiene are obtained, containing 90% cis-1,4, 8% trans-1,4 and 2% 1,2 units.

EXAMPLE 10

Example 9 is repeated with 0.2 g. of the yellow complex obtained as above and 0.1 ccm. monochlorodiethylaluminum. After 1 hour, 50 g. of polybutadiene is obtained containing more than 90% of cis-1,4 units.

EXAMPLES 11 AND 12

Example 10 is repeated except that monochlorodiethylaluminum is replaced respectively by 0.1 ccm. triethylaluminum and 0.1 ccm, dichloroethylaluminum. In the 2 cases, the conversion to polybutadiene has attained 100%, said polymer containing more than 90% of cis-1,4 units.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

Among these modifications is to be mentioned the temperature of the reaction between the complex (I) and the compound of transition metal.

We claim:

1. A catalytic composition comprising an admixture of at least one aluminum compound selected from the group consisting of $AlR_2X$, $AlRX_2$, $Al_2R_3X_3$, $AlR_3$, $AlR(OR^1)X$, $AlR_2(OR^1)$ and $AlR(OR^1)2$ wherein R and $R^1$ are monovalent hydrocarbon radicals having about 1–15 carbon atoms with a nickel complex, the molar ratio of the aluminum compound to the nickel complex being about 0.02/1 to 50/1, said nickel complex resulting from contacting a complex having the formula $R^{11}PX_4AlX_3$ with a soluble nickel complex of a compound selected from the group consisting of beta-diketones, beta-ketoesters, beta-keto aldehydes, and beta-hydroxyketones having about 2–20 carbon atoms per molecule, the atomic ratio of phosphorus in said $R^{11}PX_4AlX_3$ complex to nickel in the soluble nickel complex being about 0.1/1 to 10/1, X being a halogen atom and $R^{11}$ being a monovalent hydrocarbon radical having about 1 to 30 carbon atoms.

2. The catalytic composition of claim 1, wherein the soluble nickel complex is nickel acetylacetonate.

References Cited

UNITED STATES PATENTS

| | | | |
|---|---|---|---|
| 3,238,265 | 3/1966 | Mueller | 252—431(Carb)X |
| 3,417,160 | 12/1968 | Hambling et al. | 260—683.15(D) |
| 3,427,365 | 2/1969 | Maxfield | 252—431(P)X |

PATRICK P. GARVIN, Primary Examiner

U.S. Cl. X.R.

252—431; 260—85.3, 94.3, 429, 429.5, 438.5, 439, 683.15